(No Model.)
K. A. BRIGHAM.
TWO WHEELED VEHICLE.
No. 409,346. Patented Aug. 20, 1889.
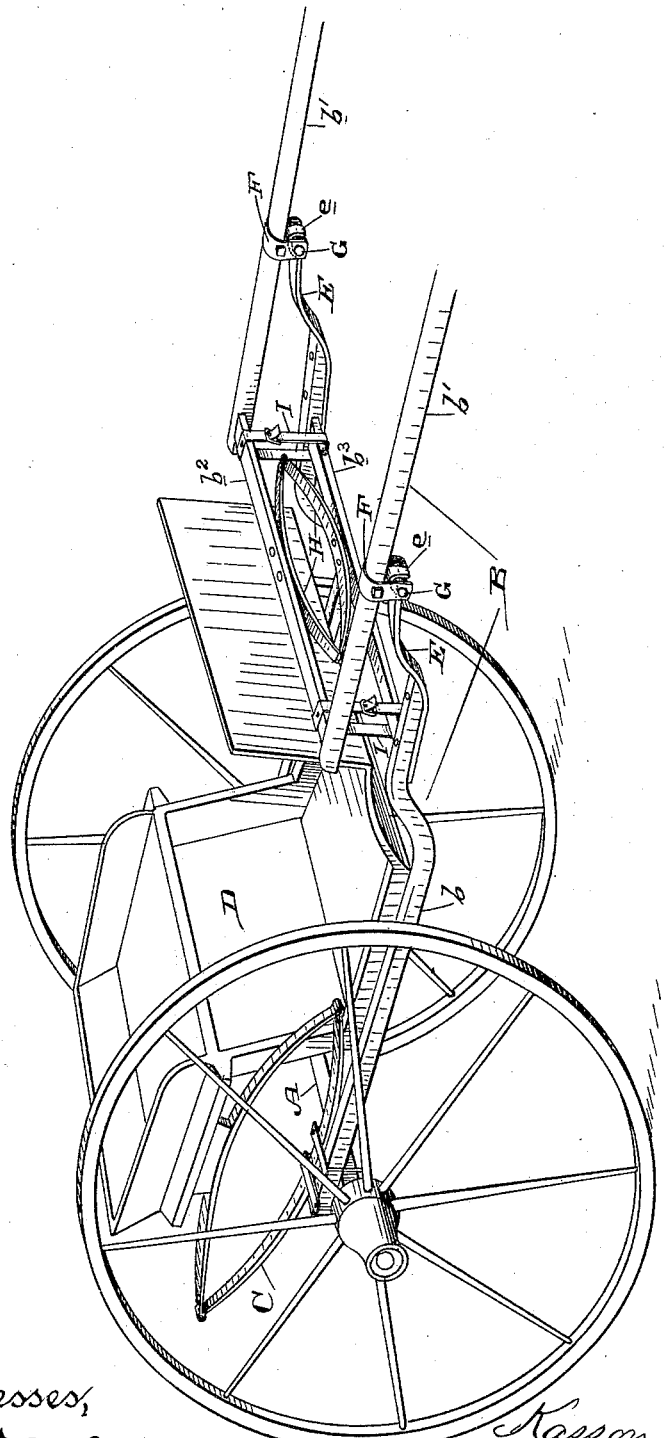
Witnesses,
Geo. H. Strong
J. H. Nurse
Inventor,
Kasson A. Brigham
By Dewey & Co
attys

UNITED STATES PATENT OFFICE.

KASSON A. BRIGHAM, OF GILROY, CALIFORNIA.

TWO-WHEELED VEHICLE.

SPECIFICATION forming part of Letters Patent No. 409,346, dated August 20, 1889.

Application filed March 6, 1889. Serial No. 302,191. (No model.)

*To all whom it may concern:*

Be it known that I, KASSON A. BRIGHAM, of Gilroy, Santa Clara county, State of California, have invented an Improvement in Two-Wheeled Vehicles; and I hereby declare the following to be a full, clear, and exact description of the same.

My invention relates to that class of two-wheeled vehicles commonly known as "carts;" and my invention consists in the novel shaft-connection hereinafter fully described.

The general object of my invention is to overcome the unpleasant horse motion which is a feature of this class of vehicles. The particular object is to provide a strong and effective shaft-connection, by which the desired result is obtained.

Referring to the accompanying drawing for a more complete explanation of my invention, the figure is a perspective view of my two-wheeled vehicle.

A is the axle.

B are the shafts, each made in two sections $b$ and $b'$.

C are the body-springs, and D is the body. The rear sections $b$ of the shafts and the springs are clipped solidly to the axle, and the body is mounted on the springs in the usual manner. The sections of the shaft are connected together in the following manner: Bolted under the forward end of the rear section $b$ of the shaft is a strap-iron E, the end of which projects forwardly and is provided with a hook $e$. Near the rear end of the forward section $b'$ of the shaft is secured a clip F, between the lower ends of which is a bolt G. The hook end $e$ of the shaft-iron E fits over and plays upon this bolt, so that the connection between the two shaft-sections is a hinged one. In order to limit and control this hinge-connection I have the following construction: Between the rear ends of the forward sections of the shafts is a cross-bar $b^2$, and between the forward ends of the rear sections of the shafts is a cross-bar $b^3$. Between these cross-bars, which lie parallel one above the other, is a spring H, which is preferably an elliptic spring, this shape being most desirable on account of its strength and firmness. The spring H is suitably clipped at its top to the top cross-bar and at its bottom to the bottom cross-bar.

The operation of the cart is as follows: The up-and-down movement which the horse communicates to the forward sections of the shafts is not transmitted to the rear sections, because said forward sections move up and down independent of the rear sections about the bolts G, on which said rear sections are hung. At the same time the forward sections are sufficiently connected with the rear sections to prevent too great or undue movement by means of the spring H between the cross-bars of the sections. The result of this construction is that the body of the vehicle remains free of that unpleasant motion which it is the object of my invention to overcome.

I am aware that the shafts of two-wheeled vehicles have heretofore been divided and have been connected by hinged joints, which are limited and controlled by means of springs; but there is the advantage in the construction I have herein set forth of a greater firmness, because of the location and character of the spring, a better connection between the sections of the shafts, less liability of breakage in the spring, and a durability and strength which render the cart desirable. The hinged connection formed between the hooked forward end of the shaft-irons E and the cross-bolt G of clips F is a simple and readily-formed one, and is economical in construction.

Straps I may be passed around the two cross-bars $b^2$ and $b^3$, to limit extreme motion and provide for safety.

Having thus described my invention, what I claim as new, and desire to secure by Letters Patent, is—

In a two-wheeled vehicle, the independent shaft-sections $b$ and $b'$, in combination with the shaft-irons E, bolted to the forward ends of the rear shaft-sections and having the hook upon their forward ends, the clips seated upon the forward shaft-sections near their rear ends, and having cross-bolts upon which the hooks of the rear shaft-section irons are hung, whereby a hinged connection is formed between the two sections of the shafts, the independent cross-bars extending between the forward ends of the rear sections and between the rear ends of the forward sections, one above the other, and the elliptic spring H between the two cross-bars and clipped to each, substantially as described.

In witness whereof I have hereunto set my hand.

KASSON A. BRIGHAM.

Witnesses:
C. D. COLE,
J. H. BLOOD.